United States Patent [19]

Trotman

[11] Patent Number: 5,626,252
[45] Date of Patent: May 6, 1997

[54] RUBBER PLUG SYSTEM FOR A VIDEO TAPE CASSETTE RECORDER

[76] Inventor: David R. Trotman, 27749 Tolima Dr., Canyon Country, Calif. 91351

[21] Appl. No.: 656,813

[22] Filed: Jun. 3, 1996

[51] Int. Cl.⁶ .................................................. G11B 23/02
[52] U.S. Cl. .................................. 220/789; 220/DIG. 19; 70/14; 360/137
[58] Field of Search .......................... 220/307, DIG. 19, 220/787, 789, 790; 215/355; 360/137, 97.02, 97.01; D14/135, 239; 70/14, 158, 57, 58, 163, 169, 167, 168

[56] References Cited

U.S. PATENT DOCUMENTS

| | | | |
|---|---|---|---|
| D. 347,227 | 5/1994 | Ernst et al. | 360/137 |
| 4,655,057 | 4/1987 | Derman | 360/137 |
| 4,809,872 | 3/1989 | Pavur | 220/DIG. 19 |
| 4,908,728 | 3/1990 | Pinkett | 360/137 |
| 4,922,734 | 5/1990 | Iannucci | 70/58 |
| 4,959,979 | 10/1990 | Filipow et al. | 70/169 |
| 4,980,785 | 12/1990 | Talmadge | 360/137 |
| 5,076,461 | 12/1991 | Nichols | 70/58 |
| 5,156,027 | 10/1992 | Reusch | 70/169 |
| 5,367,423 | 11/1994 | Phillips | 360/137 |

Primary Examiner—Jes F. Pascua
Assistant Examiner—Nathan Newhouse

[57] ABSTRACT

A plug is positionable within the recess of the recorder. The plug has a generally trapezoidal shaped interior section with a small rectangular interior region an enlarged exterior region forming a periphery essentially equal in size to the periphery of the recess of the recorder. The interior region is formed with a smaller height and width than that of the exterior region. The interior section also has trapezoidal upper and lower surfaces and trapezoidal side surfaces therebetween. An exterior section is formed as part of the plug. The exterior section has a generally rectangular configuration. The periphery of the exterior member is semi-circular in cross section. The interior and exterior member each have a depth.

1 Claim, 3 Drawing Sheets

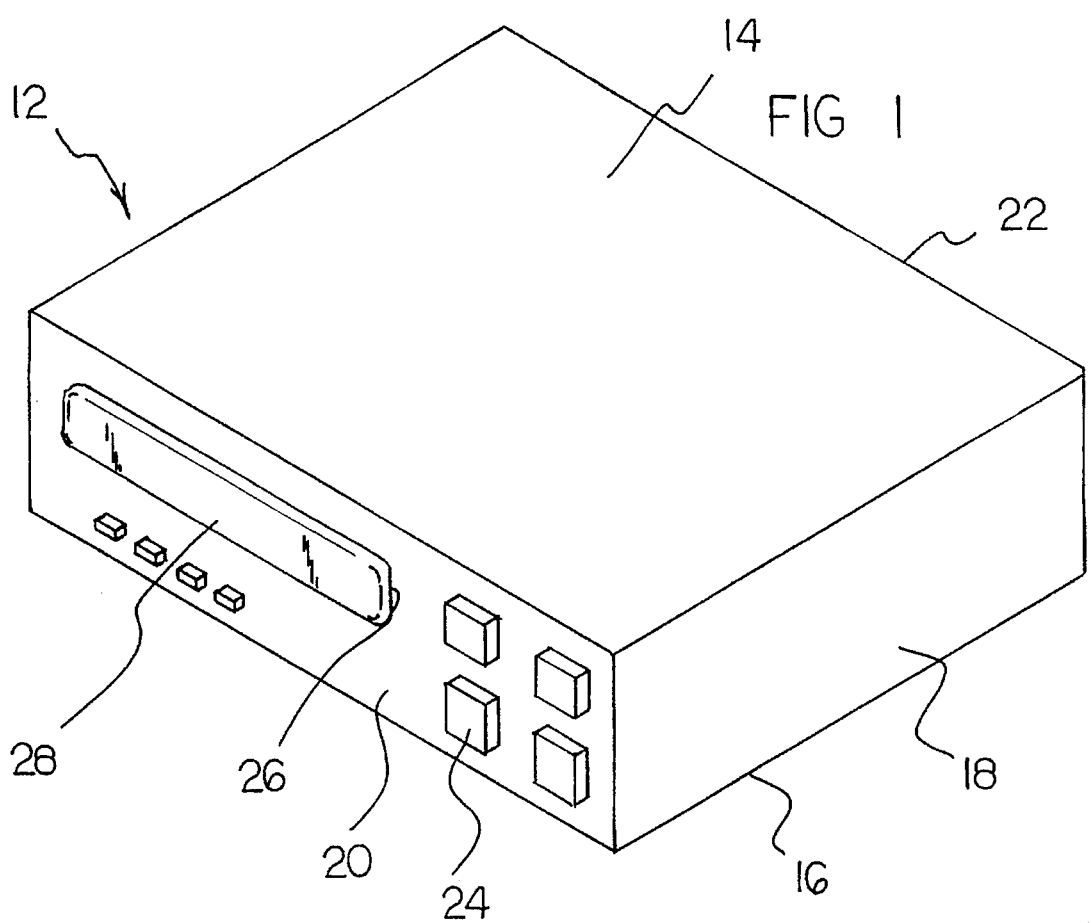
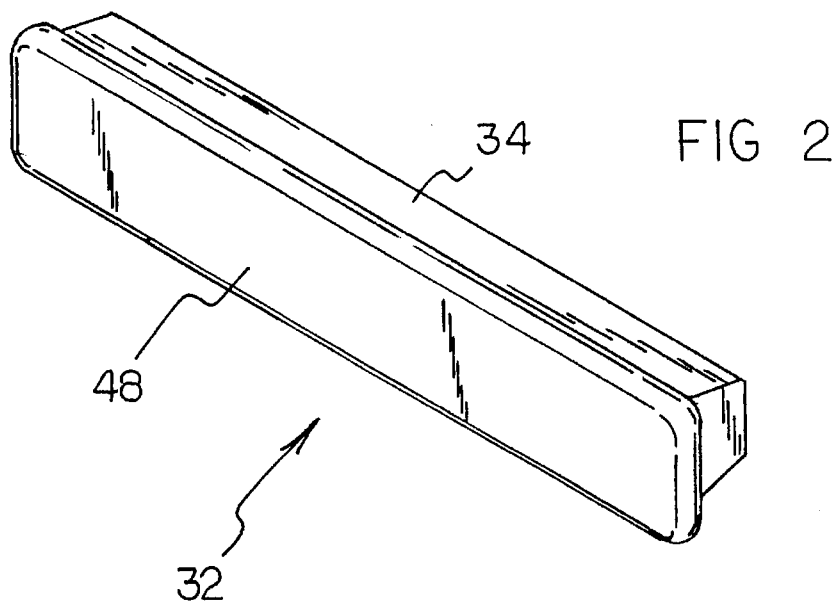

RUBBER PLUG SYSTEM FOR A VIDEO TAPE CASSETTE RECORDER

BACKGROUND OF THE INVENTION

1. Field of the Invention

The present invention relates to a rubber plug system for a video tape cassette recorder and, more particularly, pertains to preventing young children from putting foreign objects into a video tape cassette recorder.

2. Description of the Prior Art

The use of protection devices for electronic equipment of various designs and configurations are known in the prior art. More specifically, protection devices for electronic equipment of various designs and configurations heretofore devised and utilized for the purpose of preventing children from damaging electronic devices through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art in U.S. Pat. No. 4,930,821 to Jang discloses a cover-locking device for a video tape cassette.

U.S. Pat. No. 4,901,879 to Clemente, Jr., discloses a VCR cover.

U.S. Pat. No. Des. 347,227 to Ernst et. al., discloses cover for a VCR tape slot.

Lastly, U.S. Pat. No. 5,273,179 to Stratton discloses a cover.

In this respect, the rubber plug system for a video tape cassette recorder according to the present invention substantially departs from the conventional concepts and designs of the prior art, and in so doing provides an apparatus primarily developed for the purpose of preventing young children from putting foreign objects into a video tape cassette recorder.

Therefore, it can be appreciated that there exists a continuing need for new and improved rubber plug system for a video tape cassette recorder which can be used for preventing young children from putting foreign objects into a video tape cassette recorder. In this regard, the present invention substantially fulfills this need.

SUMMARY OF THE INVENTION

In view of the foregoing disadvantages inherent in the known types of protection devices for electronic equipment of various designs and configurations now present in the prior art, the present invention provides an improved rubber plug system for a video tape cassette recorder. As such, the general purpose of the present invention, which will be described subsequently in greater detail, is to provide a new and improved rubber plug system for a video tape cassette recorder apparatus and method which has all the advantages of the prior art and none of the disadvantages.

To attain this, the present invention essentially comprises a rubber plug system for a video tape-cassette door on video cassette recorders to prevent young children from putting foreign objects into a video tape cassette recorder comprising, in combination, a video tape cassette recorder. The recorder is in a generally rectilinear configuration and has an enlarged rectangular upper face and a parallel lower rectangular face. The recorder also includes small parallel side faces and front and rear faces with controls located in the front face and a rectangular recess with a door also located in the front face. The recess has a width of about 7½ inches and a height of about 1⅛ inches forming a rectangular periphery. A plug is positionable within the recess of the recorder. The plug has a generally trapezoidal shaped interior section with a small rectangular interior region. An enlarged exterior region forms a periphery essentially equal in size to the periphery of the recess of the recorder. The interior region is formed with a smaller height and width than that of the exterior region. The interior section also has trapezoidal upper and lower surfaces and trapezoidal side surfaces therebetween. The area of the interior region is between about 70 and 90 percent of the exterior region. An exterior section is formed as part of the plug. The exterior section has a generally rectangular configuration with a periphery surface between about 10 and 30 percent greater than the periphery of the exterior section of the interior member. The periphery of the exterior member is semicircular in cross section. The interior and exterior member each have a depth. The depth of the exterior member is between about 25 and 50 percent of the depth of the interior member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rubber plug system for a video tape cassette recorder which has all the advantages of the prior art protection devices for electronic equipment of various designs and configurations and none of the disadvantages.

It is another object of the present invention to provide a new and improved rubber plug system for a video tape cassette recorder which may be easily and efficiently manufactured and marketed.

It is a further object of the present invention to provide a new and improved rubber plug system for a video tape cassette recorder which is of a durable and reliable construction.

An even further object of the present invention is to provide a new and improved rubber plug system for a video tape cassette recorder which is susceptible of a low cost of manufacture with regard to both materials and labor, and which accordingly is then susceptible of low prices of sale to the consuming public, thereby making such protection devices for electronic equipment of various designs and configurations economically available to the buying public.

Still yet another object of the present invention is to provide a new and improved rubber plug system for a video tape cassette recorder which provides in the apparatuses and methods of the prior art some of the advantages thereof, while simultaneously overcoming some of the disadvantages normally associated therewith.

Still another object of the present invention is to prevent young children from putting foreign objects into a video tape cassette recorder.

Lastly, it is an object of the present invention to provide a rubber plug comprising a plug. The plug is positionable within the recess of the recorder. The plug has a generally trapezoidal shaped interior section with a small rectangular interior region an enlarged exterior region forming a periphery essentially equal in size to the periphery of the recess of the recorder. The interior region is formed with a smaller height and width than that of the exterior region. The interior section also has trapezoidal upper and lower surfaces and trapezoidal side surfaces therebetween. An exterior section is formed as part of the plug. The exterior section has a generally rectangular configuration. The periphery of the exterior member is semicircular in cross section. The interior and exterior member each have a depth.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the rubber plug system for a video tape cassette recorder constructed in accordance with the principles of the present invention.

FIG. 2 is an enlarged perspective view of the plug shown in FIG. 1.

Similar reference characters refer to similar parts throughout the several views of the drawings.

DESCRIPTION OF THE PREFERRED EMBODIMENT

Figure 3:
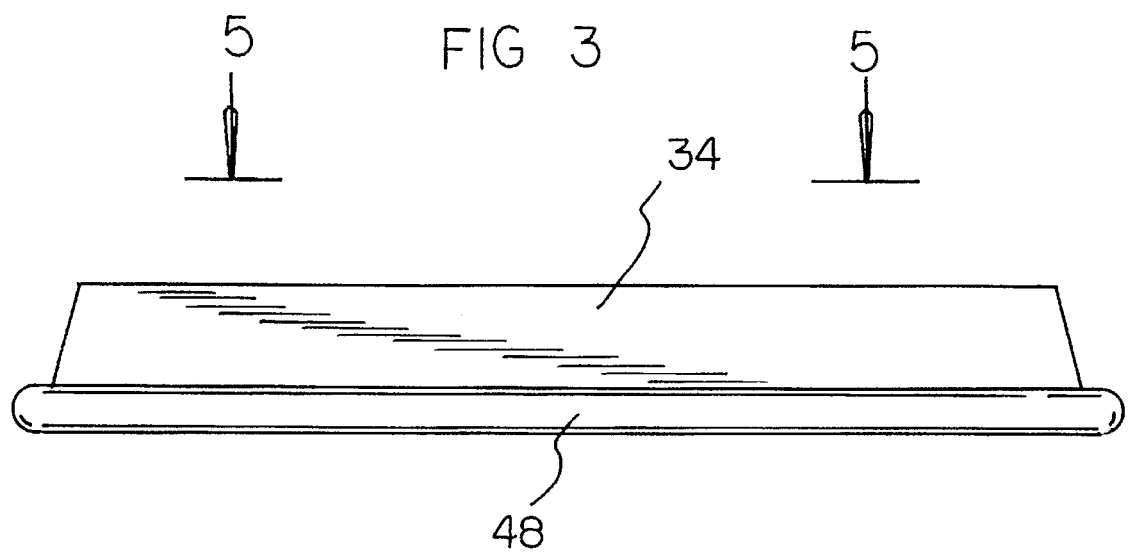
FIG. 3 is a top elevational view of the plug shown in FIGS. 1 and 2.
Figure 4:
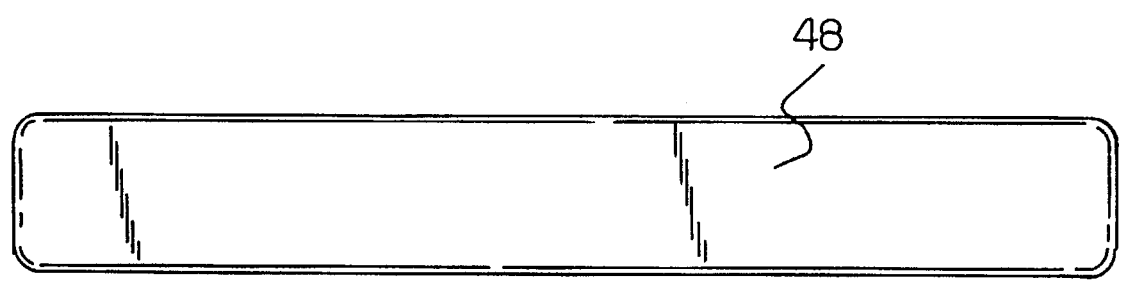
FIG. 4 is a front elevational view of the plug shown in the prior Figures.
Figure 5:
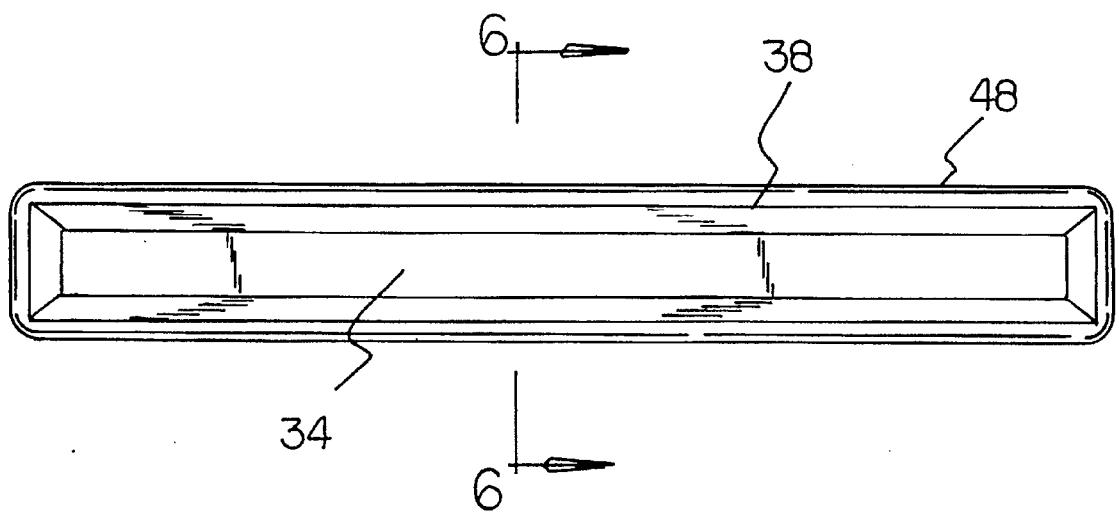
FIG. 5 is rear elevational view of the plug shown in the prior Figures taken along line 5—5 of FIG. 3.

With reference now to the drawings, and in particular to FIG. 1 thereof, a new and improved rubber plug system for a video tape cassette recorder embodying the principles and concepts of the present invention and generally designated by the reference numeral 10 will be described.

The present invention, the new and improved rubber plug system for a video tape cassette recorder, is comprised of a plurality of components. Such components in their broadest context include a video tape cassette recorder, a plug and an exterior section. Such components are individually configured and correlated with respect to each other so as to attain the desired objective.

A central component of the system 10 of the present invention is a video tape cassette recorder 12. Such recorder is formed in a generally rectilinear configuration. It has an enlarged rectangular upper surface 14. It also has a parallel rectangular lower surface 16. The recorder also includes small parallel side faces 18 and front and rear faces 20, 22. Controls 24 are located in the front face. Also in the front face is a rectangular recess 26 with an associated pivotable door 28. The location of the door and controls are in the front face for convenience of operation to a user. The recess has a width of about 7½ inches and a height of about 1⅛ inches. Together such configuration of the recess forms a rectangular periphery.

Next provided as a component of the system 10 is a plug 32. The plug is positionable within the recess of the recorder. The plug has a generally trapezoidal shaped interior section 34. Such interior section has a small rectangular interior region 36 and an enlarged rectangular exterior region 38. The exterior region forms a rectangular periphery essentially equal in size to the periphery of the recess of the recorder. The interior region is also formed to have a smaller height and a smaller width than that of the exterior region. This allows insertion of the plug into the recess of the recorder.

The interior section is also formed to have a trapezoidal upper surface 42 and a trapezoidal lower surface 44. In addition, trapezoidal surfaces are formed between the upper and lower surfaces. In the preferred embodiment, the area of the interior region is between about 70 and 90 percent of the area of the exterior region.

Figure 6:
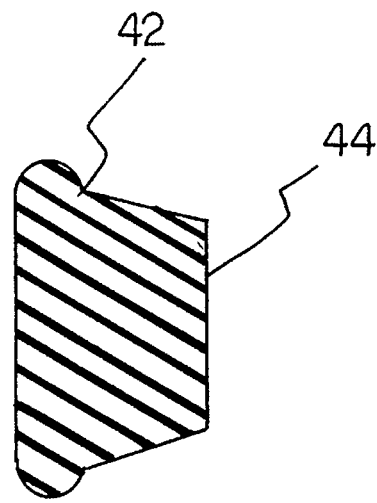
FIG. 6 is a cross sectional view taken along line 6—6 of FIG. 5.

Lastly provided is an exterior section 48 on the plug. Such exterior section is formed as part of the plug. The exterior section has a generally rectangular configuration. Such rectangle forms a periphery having an area between about 10 and 30 percent greater than that of the periphery of the exterior section of the interior member. The periphery of the exterior member is formed in a semi-circular cross section. Note in particular FIG. 6. Lastly, the interior and exterior members are each formed to have a depth. The depth of the interior member is between about 25 and 50 percent of the depth of the exterior member. Note again FIG. 6.

The entire plug is preferably formed of rubber, natural or synthetic, or blends thereof. Such provides for a resilient elastomeric material having the preferred properties for the intended objective.

The present invention is a rubber plug for the tape cassette door on a video cassette recorder that should help to prevent young children from putting foreign objects into it.

The plug is fabricated of a hard rubber compound that is firm yet flexible. It has an enlarged face that will protrude ⅜ inch from the panel when fully installed and a tapered rearward facing side that is inserted directly into the opening. Its dimensions almost exactly match those of the rectangular opening in the face of the loading panel. The seating plane measures 7½ inches long, by 1⅛ inches wide, while the face is ⅜ inch larger on all sides. it will pass through the face of the panel just one inch when in place. The fit is fully intended to be somewhat snug so children will not be able to remove it.

To use it, the tapered end is simply pressed into the opening where the tape cartridge is normally inserted. The sides of the taper will tighten against the face panel, making it difficult to remove. With a protrusion of just ⅜ inch, the fingers of young children should not be able to remove it, but an adult should not have any trouble.

It helps to prevent children from placing potentially damaging objects into such an expensive item as a video cassette recorder. It is easily employed and removed and does not alter the VCR in any way. Anyone who has had a VCR damaged with food or small toys should appreciate the clever advantages of using the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved rubber plug system for a video tape-cassette door on video cassette recorders to prevent young children from putting foreign objects into a video tape cassette recorder comprising, in combination:

a video tape cassette recorder in a generally rectilinear configuration having an enlarged rectangular upper face and a parallel lower rectangular face, the recorder also including small parallel side faces and front and rear faces with controls located in the front face and a rectangular recess with a door also located in the front face, the recess having a width of about 7½ inches and a height of about 1⅛ inches forming a rectangular periphery;

a plug constructed from rubber positionable within the recess of the recorder, the plug having a trapezoidal shaped interior section with a small rectangular interior region and an enlarged exterior region forming a periphery equal in size to the periphery of the recess of the recorder, the interior region being formed with a smaller height and width than that of the exterior region, the interior section also having trapezoidal upper and lower surfaces and trapezoidal side surfaces therebetween, the area of the interior region being 90 percent of the exterior region; and an exterior section formed as part of the plug, the exterior section having a rectangular configuration with a periphery surface 30 percent greater than the periphery of the exterior section of the interior member, the periphery of the exterior member being semicircular in cross section, the interior and exterior member each having a depth with the depth of the exterior member being between about 25 and 50 percent of the depth of the interior member.

* * * * *